United States Patent [19]

Carlton

[11] Patent Number: 4,907,939
[45] Date of Patent: Mar. 13, 1990

[54] TRANSFER METHOD USING WALKING BEAM GRIPPER

[75] Inventor: Richard J. Carlton, Santa Clara, Calif.

[73] Assignee: Phase 2 Automation, Sunnyvale, Calif.

[21] Appl. No.: 308,274

[22] Filed: Feb. 9, 1989

Related U.S. Application Data

[62] Division of Ser. No. 113,978, Oct. 29, 1987, Pat. No. 4,865,509.

[51] Int. Cl.⁴ .............................................. B65G 69/00
[52] U.S. Cl. ..................................... 414/786; 414/416
[58] Field of Search .............. 198/468.1, 773; 414/27, 414/787, 908, 786, 222, 416, 417, 798.2, 788.3, 798.9

[56] References Cited

U.S. PATENT DOCUMENTS

| 3,702,138 | 11/1972 | Abrahemsson et al. | 414/787 X |
| 4,290,734 | 9/1981 | VanBreen | 414/787 X |
| 4,393,981 | 7/1983 | Wada et al. | 414/27 X |
| 4,394,899 | 7/1983 | Fluck | 198/468.1 X |
| 4,569,625 | 2/1986 | Dorumsgaard et al. | 414/416 |
| 4,589,811 | 5/1986 | Riccardo et al. | 414/27 X |
| 4,645,401 | 2/1987 | Hopkins et al. | 414/416 X |
| 4,735,540 | 4/1988 | Allen et al. | 414/908 X |

FOREIGN PATENT DOCUMENTS 249274  7/1969  U.S.S.R. ............................. 198/773

Primary Examiner—Frank E. Werner
Attorney, Agent, or Firm—Paul F. Wille

[57] ABSTRACT

A method for transporting annular disks is disclosed in which the disks, stored in a cassette, are loaded onto a cantilever as a group, transported to another location, and unloaded singly by a walking beam motion along the cantilever. The process is reversed for loading the disks into a cassette.

4 Claims, 1 Drawing Sheet

TRANSFER METHOD USING WALKING BEAM GRIPPER

This is a division of application Ser. No. 113,978, filed Oct. 29, 1987, now U.S. Pat. No. 4,865,509.

BACKGROUND OF THE INVENTION

This invention relates to apparatus for loading disks from one container to another and, in particular, to a transfer mechanism which sequentially loads a pallet by walking disks along a cantilever.

In the manufacture of what is known as A hard disk for the magnetic storage of digital information, a variety of thin layers are deposited upon a flat, annular, metal member. The quality of these layers determines, in part, the amount of data which can be stored on a disk of a given size. It is thus desirable to handle the disks as little as possible so as not to damage the layers. Yet, in order to plate, or otherwise treat, the disks, it is necessary to handle them in order to move them from one processing station to another.

For several operations, the disks can be transported in a vertical pallet having a plurality of holes slightly larger than the outside diameter of a disk. The pallets provide a planar and bulky form of transport and are not always needed. Cassettes, or grooved boxes provide a much more compact way to carry the disks, but are not amenable for use in processing the disks. Thus, it becomes necessary to perform some sort of transfer between these two types of holders.

There is a dilemma which arises when considering such a transfer, viz. the disks must be handled as little as possible yet the transfer cannot take a great deal of time. For example, the disks could be taken singly from a cassette and placed directly on the vertical pallet. This is too slow for commercial production of disks. Simply operating the transfer mechanisms more quickly is of no avail since the mass of the disks, while small, is not insignificant. Large accelerations require proportionately large equipment to maintain positional accuracies. Further, such accelerations cause large amplitude vibrations. More importantly, the disks are more likely to rub against the handling apparatus, producing particles which can contaminate the disks.

In view of the foregoing, it is therefore an object of the present invention to provide apparatus for transferring disks directly from a cassette to and from a vertical pallet.

Another object of the present invention is to provide apparatus for effecting such transfer with minimal handling of the disks.

SUMMARY OF THE INVENTION

The foregoing objects are achieved in the present invention wherein a walking beam mechanism removes the disks enmasse from a cassette and places them singly in a vertical pallet. In so doing, the motion of the transfer mechanism is minimized by having to address the cassette only once. The walking beam mechanism includes both an inside and an outside grip which stabilizes the disks and adapts to both cassettes and pallets without the need for adapters or holders for the disks.

BRIEF DESCRIPTION OF THE DRAWINGS

A more complete understanding of the present invention can be obtained by considering the following detailed description in conjunction with the accompanying drawings, in which.

DETAILED DESCRIPTION

Figure 1:
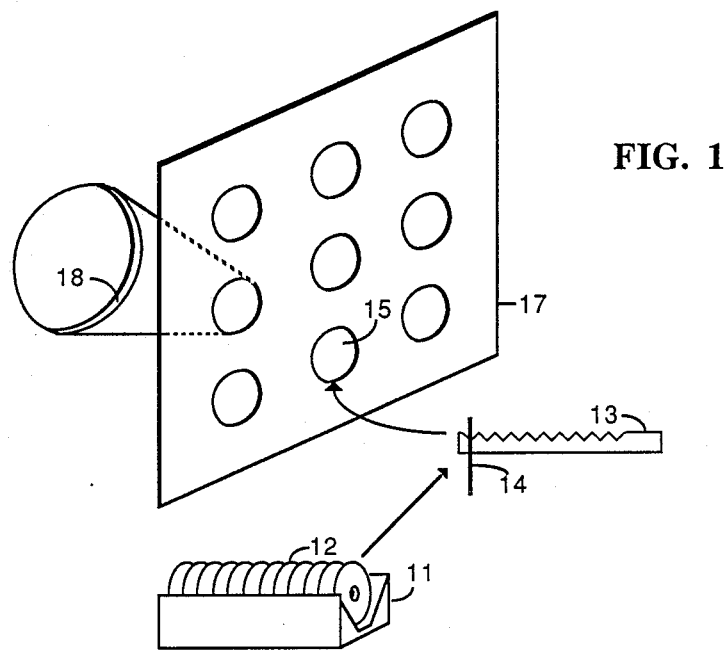
FIG. 1 illustrates the overall operation of the present invention.

FIG. 1 illustrates the transfer of wafers from a cassette to a pallet in accordance with the present invention. As illustrated in FIG. 1, cassette 11 contains a plurality of disks 12 which are to be transferred to a pallet. Cantilever beam 13 is provided with a plurality of notches or recesses for receiving individual disks, such as disk 14. The spacing of the notches corresponds to the spacing of the disks in cassette 11.

Pallet 17 comprises a plurality of apertures, such as aperture 15. These apertures have a diameter which is slightly greater than the diameter of disks 12. In one form of the present invention, the perimeter of aperture comprises recessed groove 18 for receiving a disk and holding it by a portion of its perimeter via gravity. Since the disks are held in pallet 17 by the outer edge thereof, it is necessary to grasp the disks by the central aperture for the transfer. This function is served by cantilever 13 which is inserted through the apertures in disks 12.

As indicated by the arrows in FIG. 1, disk 14 is removed from cassette 11 and inserted into aperture 15. While one could remove the disks singly, such would entail a large amount of motion, slowing down the transfer process. Instead, cantilever 13 is inserted the length of cassette 11 through the apertures in wafers 12 and removes wafers 12 as a group. The wafers are now held by the central aperture thereof, and can be placed in the apertures in pallet 17.

Although one could simply insert cantilever 13 progressively further through the apertures in pallet 17 as cantilever 13 becomes unloaded, such increases the travel of cantilever 13 at a point at which a relatively precise placement is desired. In accordance with the present invention, cantilever 13 is further provided with a walking beam transfer action such that the disks from cassette 11 are transferred to the outer most tip position on cantilever 13 for placement in an aperture on pallet 17. Because each disk must be placed within the recesses in pallet 17, the transfer motion must be relatively precise. By combining the walking beam action with cantilever 13, one obtains a relatively precise motion comparatively easily and inexpensively.

Figure 2:
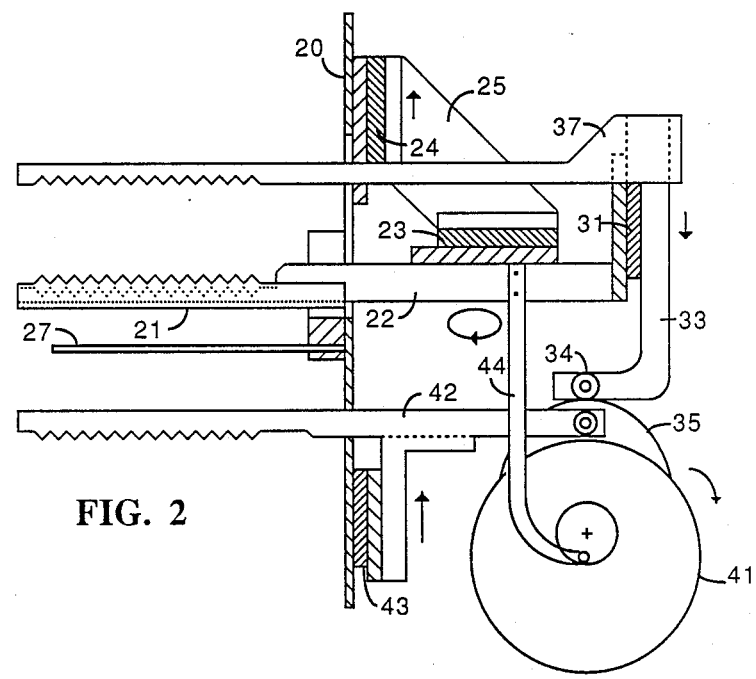
FIG. 2 illustrates the transfer mechanism.

FIG. 2 illustrates in greater detail the walking beam motion, in addition to other details of the present invention. In particular, cantilever 21 is connected to a suitable reference, such as wall 20, and provides a plurality of locations for holding disks. These locations, which preferably comprise notches or grooves along the length of cantilever 21, serve to hold the disks in a spaced apart relationship. The spacing of the grooves or notches corresponds to the spacing of the disks in cassette 11. Immediately adjacent cantilever 21 is walking beam 22, which has a corresponding number of grooves or notches. Walking beam 22 is positioned slightly lower than cantilever 21 while cantilever 21 is loading disks from cassette 11. Walking beam 22 is connected by a pair of sliding blocks, 23 and 24, to reference 20. Sliding block 23 enables motion in a horizontal direction, while sliding block 24 enables motion in a vertical direction. Sliding blocks 23 and 24 are interconnected by arm 25. Walking beam 22 is connected to an eccentrically mounted bearing on the shaft common to cams 35 and 41 via arm 44.

Walking beam 22 is also connected by sliding block 31 to arm 33. Arm 33 is coupled by way of cam follower 34 to cam 35. The other end arm 33 has upper jaw 37 attached thereto. Upper jaw 37 comprises a plurality of grooves or notches in the lower surface thereof facing walking beam 22. Cam follower 34 is not always in contact with cam 35.

A second cam 41, which is preferably rotating about the same axis as cam 35, controls the motion of inside jaw 42 which is coupled to reference 20 by way of sliding block 43. Cam follower for jaw 42 is not always in contact with cam 41.

As thus configured, cantilever 21 and inside jaw 42 are serried in opposite directions, enabling these members to act as jaws for gripping the disks by the central hole therein. This is referred to herein as an "inside" grip. By way of contrast, if similar jaws were serried oppositely, i.e. the notches on the inside edges, such would be suitable for grasping the disks by the outside edge thereof. Such could be termed an "outside" grip. While jaws 22 and 37 appear to meet this description, they do not function in this manner. Jaws 22 and 37 grasp the disk across a radius of the annulus, i.e. lower jaw 22 is inserted in the central hole and upper jaw 37 rests on the outside of the disk. This is termed a "radial" grip.

During the insertion operation, inside jaw 42 is elevated for clearance, and jaw 42 and cantilever 21 are inserted through the central holes in a plurality of disks contained in a cassette. When cantilever 21 is fully inserted, inside jaw 42 can be lowered thereby firmly gripping the disks. The plurality of disks is then lifted out of the cassette and transported to a location adjacent a pallet, such as pallet 17 illustrated in FIG. 1. Upper jaw 37 and walking beam 22 are then moved away from the pallet by the eccentric motion through arm 44. Cantilever 21 is inserted slightly into aperture 15 and the disk lowered into recess 18 (FIG. 1).

As illustrated in FIG. 2, distance gage or index means 27, attached to reference 20, can be used to facilitate the location of the disk relative to channel 18 by providing a fixed distance between pallet 17 and reference 20. Thus, in accordance with a preferred embodiment of the present invention, the outer most disk, i.e. the left-hand most disk as the system is illustrated in FIG. 2, is readily and accurately located with respect to pallet 17.

The system is then moved slightly away from pallet 17 to provide clearance for moving the plurality of disks outwardly along cantilever 21 which is accomplished by rotating walking beam 22 and lowering upper jaw 37 by way of powered arm 44, arm 33 and cam 35, respectively. These jaws had previously been moved to the right to provide clearance for inserting a disk into the pallet. The jaws are now positioned one disk location to the right and engage the plurality of disks by the inside and outside edges thereof. Walking beam 22 and upper jaw 37 are then raised together so that the apertures of the disks clear cantilever 21. Walking beam 22 and upper jaw 37 are then moved to the left one position so that the group of disks is moved to the left also. The jaws are lowered so that the plurality of disks engage respective grooves within cantilever 21.

If the cassette from which the disks were withdrawn had not been full, suitable sense apparatus (not shown) would indicate that the outer most location on cantilever 21 did not contain a disk. If this were the case, the walking beam motion, wherein walking beam 22 and cantilever 21 move relative to each other to alternatively support the disks, would continue until a disk is supplied to the outer most location. At this point, the system is located relative to pallet 17 as described above and the subsequent disks loaded singly into respective locations in the pallet.

By reversing the sequence described above, a pallet is unloaded, one disk at a time, onto cantilever 21. The disks are "walked" along cantilever 21 as necessary, until the pallet is empty or cantilever 21 is full, and the disks are then loaded as a group into a cassette in a single operation. It is a matter of choice whether or not cantilever 21 is filled, e.g. one may want to sort disks from different pallets into separate cassettes, depending upon the process performed on the disks.

There is thus provided by the present invention a system for readily and efficiently transferring disks from a cassette to a pallet for processing. The system entails minimal handling of the disks and provides accurate motion to effect the transfer.

Having thus described the invention it will be apparent to those of ordinary skill in the art that various modifications can be made within the scope of the present invention. For example, sliding blocks 23 and 24 need not be powered, although some external drive mechanism must then be provided for moving the jaws as indicated. Index 27 is fixed to reference 20 so that it accurately spaces pallet 17 from reference 20. However, this is not to say that index 27 is fixed. It need only be immovable along its length. Index 27 is preferably held at one end on a perpendicular arm, attached to reference 20, so that index 27 can be relocated out of the way if it becomes necessary to insert cantilever 21 further through center holes of disks 12 in cassette 11 for example. Alternatively, index 27 can be fixed to reference 20 as illustrated in FIG. 2. It is understood by those of skill in the art that the cams illustrated in FIG. 2 are shown in a somewhat simplified form as comprising ellipses. It is understood that more complex shapes, e.g. for controlling the acceleration of the disks, would be used in implementing the present invention. It is also understood by those of skill in the art that the motion of the arm and pallet is relative. That is, it is immaterial, insofar as the operation of the present invention is concerned, whether a system including reference 20 is moved relatively to pallet 17 or pallet 17 is moved relative to a system comprising reference 20. In a preferred embodiment of the present invention, the system comprising reference 20 is fixed while the cassette and pallet are moved to supply or receive disks from cantilever 21. It is not necessary that cantilever 21, upper jaw and walking beam 22, respectively comprise the same number of notches or grooves for holding disks. For example, cantilever 21 could comprise at least one extra notch at the left-hand end thereof, as illustrated in FIG. 2, thereby extending into aperture 15 while jaws 22 and 37 do not.

What is claimed:

1. A method for transferring a plurality of annular disks, by way of cantilever means having a free end and a fixed end, from a cassette to a planar pallet having a plurality of apertures, each for containing a single disk, loading said plurality of disks from said cassette onto said cantilever means by inserting said cantilever through the holes in the middle of said annular disks;

transporting said disks on said cantilever means to said pallet;

unloading a first disk from the free end of said cantilever means into one of said apertures in said pallet;

advancing the remaining disks to the free end of said cantilever means by a walking beam motion; and unloading the next disk from the free end of said cantilever means into another aperture in said pallet.

2. The method as set forth in claim 1 and further comprising the step of:

repeating the last two steps until the cantilever means is unloaded.

3. The method as set forth in claim 1 wherein said cantilever means comprises a serried upper surface for receiving said disks and said loading step comprises:

inserting said cantilever means into the apertures of all of said plurality of annular disks and raising said cantilever means to engage said disks with said serried upper surface.

4. A method for transferring a plurality of annular disks, by way of cantilever means having a free end and a fixed end, from a planar pallet having a plurality of apertures each for containing one of said disks to a cassette, comprising the steps of:

loading said plurality of disks singly on to the free end of said cantilever means;

advancing said disks toward the fixed end of said cantilever means by a walking beam motion;

transporting said disks on said cantilever means to said cassette; and unloading said disks into said cassette by placing said disks in said cassette and removing said cantilever means from the holes in the middle said annular disks.

* * * * *